J. NEWELL.
Improvement in Animal Traps.

No. 124,149. Patented Feb. 27, 1872.

Witnesses
John A. Ellis
J. V. D. White

Inventor
Josiah Newell,
per
T. H. Alexander
Atty

UNITED STATES PATENT OFFICE.

JOSIAH NEWELL, OF YPSILANTI, MICHIGAN.

IMPROVEMENT IN ANIMAL-TRAPS.

Specification forming part of Letters Patent No. 124,149, dated February 27, 1872.

SPECIFICATION.

*To all whom it may concern:*

Be it known that I, JOSIAH NEWELL, of Ypsilanti, in the county of Washtenaw and State of Michigan, have invented certain new and useful Improvements in Animal-Traps; and I do hereby declare that the following is a full, clear, and exact description thereof, reference being had to the accompanying drawing and to the letters of reference marked thereon, which form a part of this specification.

The nature of my invention consists in the construction and arrangement of an "animal-trap," as will be hereinafter more fully set forth.

In order to enable others skilled in the art to which my invention appertains to make and use the same, I will now proceed to describe its construction and operation, referring to the annexed drawing, in which—

Figure 1:
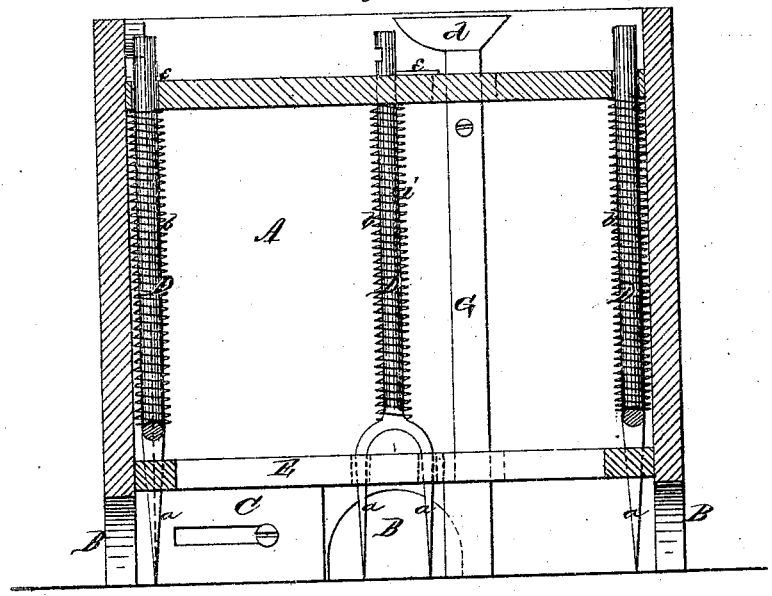
Figure 2:
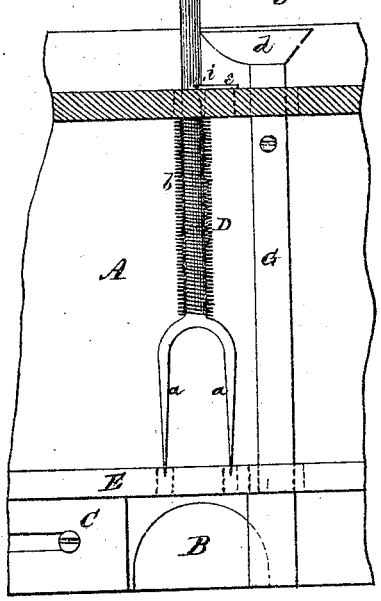

Figure 1 represents a vertical cross-section, and Fig. 2 a view of the trap when set.

A represents a box of any suitable dimensions, one or more sides of which is at its lower edge provided with an opening, B, of any desired size. On the inside of the box, on one side of the opening B, is an adjustable gate, C, which may be fastened at any point necessary to make the opening larger or smaller, according to the kind of animal to be trapped. Through the top of the box A passes a rod, D, the lower end of which is forked, having two or more straight, sharp-pointed prongs, $a$ $a$, which pass through a cleat or bar, E, attached on the inside of the box immediately above the opening B. The prongs $a$ $a$ are situated immediately inside of and opposite the said opening. Around the rod D is a spiral spring, $b$, placed between the cleat E and the top of the box, and on the inside of the box is pivoted a lever, G, the lower end of which covers a part of the opening B on the side thereof opposite to that on which the gate C is placed. The upper end of this lever passes through a slot in the top of the box, and is immediately above the same provided with a projecting catch or button, $d$. When the rod D is raised so that the prongs $a$ $a$ cannot be seen at the opening, a notch, $i$, in said rod catches on a plate, $e$, attached to the top of the box and holds it up in this position. When, now, the animal attempts to enter the opening B to get at the bait placed inside thereof, said opening should be regulated so as to admit the head of the animal easily, but not the entire body without rubbing against the lower end of the lever G. This rubbing against the lever causes the button $d$ at its upper end to strike the rod D, and disengage the same from the plate $e$. The spring $b$ then instantly and with great force throws the rod downward, pinning the animal and holding him fast.

The trap is set by means of a wire hook, which may be caught in a notch in the upper end of the rod, or spring-fork, as it may be called. This device may be used for a single hole or trap, or for as many as may be desired.

Having thus fully described my invention, what I claim as new, and desire to secure by Letters Patent, is—

1. The adjustable gate C, arranged within the opening of the trap A, in combination with the spring-fork D and lever G, substantially as described, and for the purpose set forth.

2. The combination of the spring-fork D $a$, with notch $i$, plate $e$, and lever G, with button $d$, all constructed and arranged to operate substantially as and for the purposes herein set forth.

In testimony that I claim the foregoing as my own I affix my signature in presence of two witnesses.

JOSIAH NEWELL.

Witnesses:
 GEO. A. NEUT,
 J. A. STEBBINS.